(12) United States Patent
Bhusarapu et al.

(10) Patent No.: US 9,114,997 B2
(45) Date of Patent: *Aug. 25, 2015

(54) PRODUCTION OF POLYCRYSTALLINE SILICON BY THE THERMAL DECOMPOSITION OF SILANE IN A FLUIDIZED BED REACTOR

(71) Applicant: SunEdison, Inc., Maryland Heights, MO (US)

(72) Inventors: Satish Bhusarapu, Houston, TX (US); Puneet Gupta, Houston, TX (US); Yue Huang, Midlothian, VA (US)

(73) Assignee: SunEdison, Inc., Maryland Heights, MO (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/628,282

(22) Filed: Sep. 27, 2012

(65) Prior Publication Data

US 2013/0084234 A1  Apr. 4, 2013

Related U.S. Application Data

(60) Provisional application No. 61/541,642, filed on Sep. 30, 2011.

(51) Int. Cl.
| | |
|---|---|
| *C01B 33/029* | (2006.01) |
| *C01B 33/021* | (2006.01) |
| *C01B 33/03* | (2006.01) |
| *C01B 33/027* | (2006.01) |
| *F23G 5/30* | (2006.01) |
| *F23G 7/06* | (2006.01) |

(52) U.S. Cl.
CPC .............. *C01B 33/03* (2013.01); *C01B 33/027* (2013.01); *C01B 33/029* (2013.01); *F23G 5/30* (2013.01); *F23G 7/06* (2013.01); *F23G 2202/30* (2013.01); *F23G 2209/142* (2013.01)

(58) Field of Classification Search
CPC ....... C01B 33/029; C01B 33/03; F27B 15/00; F27B 15/02–15/06; F27B 15/10
See application file for complete search history.

(56) References Cited

U.S. PATENT DOCUMENTS

| | | |
|---|---|---|
| 3,963,838 A | 6/1976 | Setty et al. |
| 4,092,446 A | 5/1978 | Padovani et al. |

(Continued)

FOREIGN PATENT DOCUMENTS

| | | |
|---|---|---|
| DE | 19948395 A1 | 5/2001 |
| GB | 1570131 | 6/1980 |

(Continued)

OTHER PUBLICATIONS

PCT Invitation to Pay Additional Fee of the International Searching Authority mailed on Dec. 18, 2012 regarding PCT/US2012/057508.

(Continued)

*Primary Examiner* — Anthony J Zimmer
*Assistant Examiner* — Justin Bova
(74) *Attorney, Agent, or Firm* — Armstrong Teasdale LLP

(57) ABSTRACT

Processes for producing polycrystalline silicon by thermal decomposition of silane are disclosed. The processes generally involve thermal decomposition of silane in a fluidized bed reactor operated at reaction conditions that result in a high rate of productivity relative to conventional production processes.

49 Claims, 3 Drawing Sheets

(56) References Cited

U.S. PATENT DOCUMENTS

| | | | |
|---|---|---|---|
| 4,784,840 A | 11/1988 | Gautreaux et al. | |
| 4,820,587 A | 4/1989 | Gautreaux et al. | |
| 4,868,013 A | 9/1989 | Allen | |
| 4,883,687 A | 11/1989 | Gautreaux et al. | |
| 4,992,245 A | 2/1991 | Van Slooten et al. | |
| 5,077,028 A | 12/1991 | Age | |
| 5,165,908 A * | 11/1992 | Van Slooten et al. | 423/349 |
| 5,798,137 A | 8/1998 | Lord et al. | |
| 6,007,869 A | 12/1999 | Schreieder et al. | |
| 6,849,244 B2 | 2/2005 | Konig et al. | |
| 7,029,632 B1 | 4/2006 | Weidhaus et al. | |
| 7,771,687 B2 | 8/2010 | Kim et al. | |
| 7,972,562 B2 | 7/2011 | Kim et al. | |
| 2002/0102850 A1 | 8/2002 | Kim et al. | |
| 2008/0056979 A1 | 3/2008 | Arvidsoon et al. | |
| 2008/0241046 A1 | 10/2008 | Hertlein et al. | |
| 2008/0267834 A1 | 10/2008 | Kim et al. | |
| 2008/0299291 A1 | 12/2008 | Weidhaus et al. | |
| 2009/0004090 A1 | 1/2009 | Kim et al. | |
| 2009/0047204 A1 * | 2/2009 | Kim et al. | 423/349 |
| 2009/0095710 A1 | 4/2009 | Kim et al. | |
| 2009/0324479 A1 | 12/2009 | Kulkarni et al. | |
| 2009/0324819 A1 | 12/2009 | Kulkarni et al. | |
| 2010/0047136 A1 * | 2/2010 | Kim et al. | 422/112 |
| 2010/0112744 A1 * | 5/2010 | Molnar | 438/57 |
| 2011/0158857 A1 | 6/2011 | Erk | |
| 2011/0158888 A1 | 6/2011 | Erk | |

FOREIGN PATENT DOCUMENTS

| | | |
|---|---|---|
| JP | 06-127914 | 10/1994 |
| WO | 2008018760 A1 | 2/2008 |
| WO | 2012054184 A1 | 4/2012 |
| WO | 2012087628 A2 | 6/2012 |

OTHER PUBLICATIONS

Perry et al., "Design of Fluidized-Bed Systems" Perry's Chemical Engineers' Handbook, 7th Ed., pp. 17-4, 1997.

PCT International Search Report and Written Opinion of the International Searching Authority mailed on Dec. 17, 2012 regarding PCT/US2012/057524.

Kimura et al., Numerical Model of a Fluidized Bed Reactor for Polycrystalline Silicon Production-Estimation of CVD and Fines Formation, Journal de Physique IV, dated 1991, pp. C2-103-C2-110.

Tejero-Ezpeleta et al., Optimization of Reaction Conditions in a Fluidized-Bed for Silane Pyrolysis, The Canadian Journal of Chemical Engineering, dated Jun. 2004, vol. 82, pp. 520-529.

* cited by examiner

PRODUCTION OF POLYCRYSTALLINE SILICON BY THE THERMAL DECOMPOSITION OF SILANE IN A FLUIDIZED BED REACTOR

CROSS-REFERENCE TO RELATED APPLICATION

This application claims the benefit of U.S. Provisional Application No. 61/541,642 filed Sep. 30, 2011, which is incorporated herein by reference in its entirety.

BACKGROUND

The field of the present disclosure relates to processes for producing polycrystalline silicon by thermally decomposing silane and, particularly, processes that involve thermal decomposition of silane in a fluidized bed reactor operated at reaction conditions that result in a high rate of productivity relative to conventional production processes.

Polycrystalline silicon is a vital raw material used to produce many commercial products including, for example, integrated circuits and photovoltaic (i.e., solar) cells. Polycrystalline silicon is often produced by a chemical vapor deposition mechanism in which silicon is deposited from a thermally decomposable silicon compound onto silicon particles in a fluidized bed reactor. The seed particles continuously grow in size until they exit the reactor as polycrystalline silicon product (i.e., "granular" polycrystalline silicon). Suitable decomposable silicon compounds include, for example, silane and halosilanes such as dichlorosilane and trichlorosilane.

In many fluidized bed reactor systems and especially in systems where material from the fluid phase chemically decomposes to form solid material such as in polycrystalline silicon production systems, solid material may deposit onto the walls of the reactor. The wall deposits often alter the reactor geometry which can decrease reactor performance. Further, portions of the wall deposits can dislodge from the reactor wall and fall to the reactor bottom. Often the reactor system must be shut down to remove the dislodged deposits. To prevent an untimely reactor shut down, the deposits must be periodically etched from the reactor wall and the reactor must be cleaned thereby reducing the productivity of the reactor. The etching operations may cause stress to the reactor system due to thermal shock or differences in thermal expansion or contraction which may result in cracking of the reactor walls which requires the unit to be rebuilt. These problems are particularly acute in fluidized bed reactor systems used in the production of polycrystalline silicon. Previous efforts to reduce deposition of solids on the walls of the reactor have resulted in a loss of reactor productivity (i.e., less conversion from silane to polycrystalline silicon) and involve relatively larger reaction zones to achieve the same productivity as conventional methods.

Thus a continuing need exists for methods for producing polycrystalline silicon which limit or reduce the amount of deposits on the reactor but which result in improved productivity relative to conventional methods.

SUMMARY

One aspect of the present disclosure is directed to a process for producing polycrystalline silicon by the thermal decomposition of silane in a fluidized bed reactor having a reaction chamber. The reaction chamber has a cross-section through which feed gases pass. The fluidized bed reactor produces at least about 100 kg/hr of polycrystalline silicon per square meter of reaction chamber cross-section. One or more feed gases are introduced into the reaction chamber with one or more of the gases comprising silane. The overall concentration of silane in the feed gases fed into the reaction chamber is less than about 15% by volume. The pressure in the reaction chamber is at least about 3 bar. Silane thermally decomposes in the reaction chamber to deposit an amount of silicon on the silicon particles.

Another aspect of the present disclosure is directed to a process for producing polycrystalline silicon by the thermal decomposition of silane in a fluidized bed reactor having a reaction chamber. The reaction chamber has a core region, a peripheral region and a cross-section through which feed gases pass. The fluidized bed reactor produces at least about 100 kg/hr of polycrystalline silicon per square meter of reaction chamber cross-section. A first feed gas comprising silane is introduced into the core region of the reaction chamber. The reaction chamber contains silicon particles and the first feed gas contains less than about 20% by volume silane. Silane thermally decomposes in the reaction chamber to deposit an amount of silicon on the silicon particles. A second feed gas is introduced into the peripheral region of the reaction chamber. The concentration of silane in the first feed gas exceeds the concentration in the second feed gas and the pressure in the reaction chamber is at least about 3 bar.

A further aspect of the present disclosure is directed to a process for producing polycrystalline silicon by the thermal decomposition of silane in a fluidized bed reactor. The fluidized bed reactor has a reaction chamber and a distributor for distributing gases into the reaction chamber. The fluidized bed reactor produces at least about 100 kg/hr of polycrystalline silicon per square meter of reaction chamber cross-section. One or more feed gases are introduced into the distributor to distribute the gases into the reaction chamber. The reaction chamber contains silicon particles and the temperature of each feed gas that contains at least about 1% by volume silane is less than about 400° C. prior to introduction into the distributor. The pressure in the reaction chamber is at least about 3 bar. Silane thermally decomposes in the reaction chamber to deposit an amount of silicon on the silicon particles.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

DETAILED DESCRIPTION

In accordance with embodiments of the present disclosure, it has been found that productivity of a fluidized bed reactor in which silane is thermally decomposed to form polycrystalline silicon may be maintained or even enhanced in production processes that are adapted to reduce the deposition of silicon deposits on reactor walls.

Methods for Reducing the Deposition of Material on the Reactor Walls

In various embodiments of the present disclosure, formation of silicon deposits on the walls of the reactor may be reduced by maintaining the overall concentration of silane in the feed gas to be below about 20% by volume and/or, as in multi-gas systems, by maintaining the concentration of gases introduced into the core of the reactor to below about 15% by volume. Alternatively or in addition, the gases introduced into the reaction and, in particular, gases that contain at least about 1% by volume silane (or even at least about 3% or at least about 5% by volume silane) are maintained below about 400° C. prior to introduction into the distributor of the reactor to prevent deposition of silicon onto the distributor.

Figure 1:
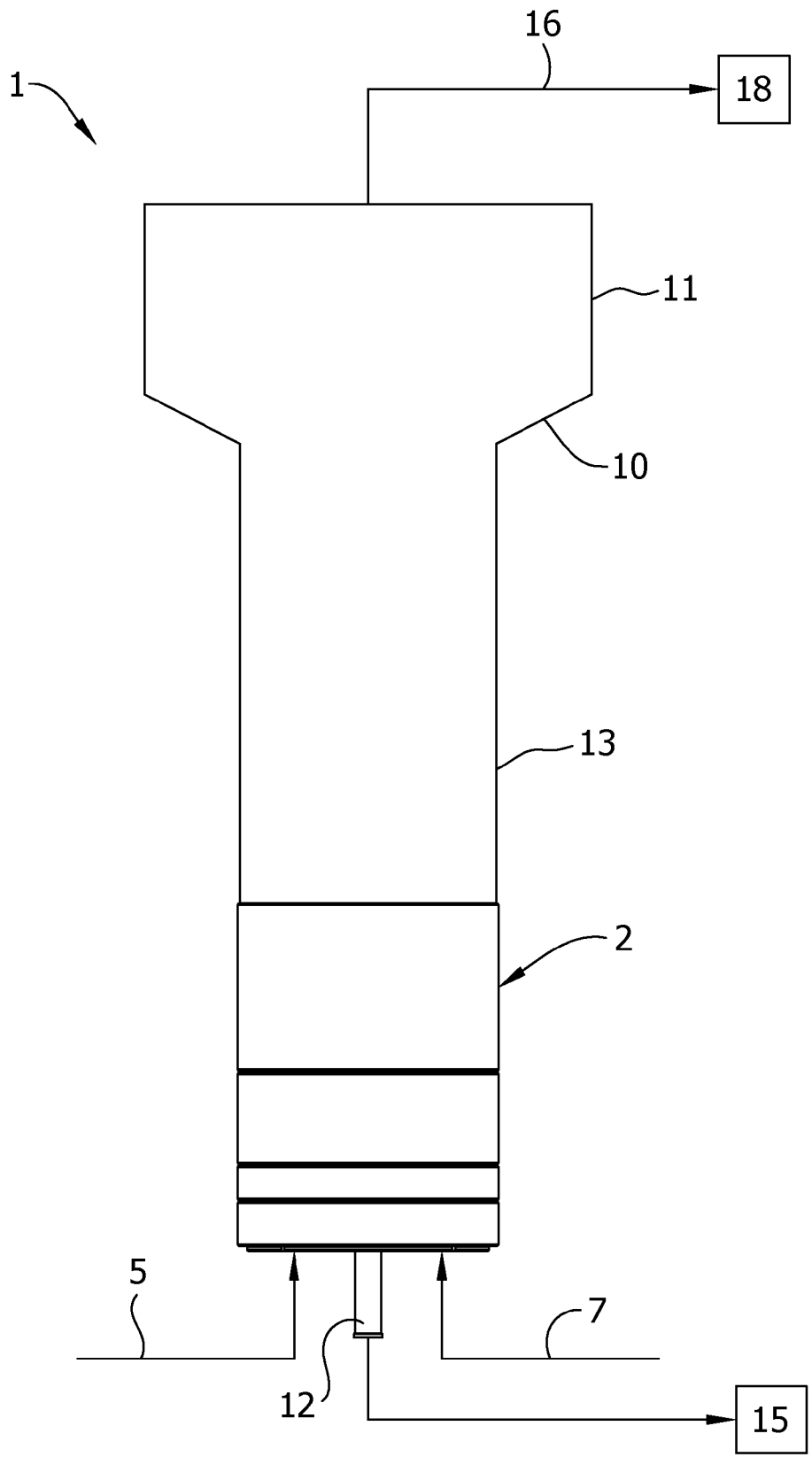
FIG. 1 is schematic of a fluidized bed reactor suitable for use in accordance with methods of the present disclosure with flows into and out of the reactor being shown.

Referring now to FIG. 1, an exemplary fluidized bed reactor 1 for carrying out the processes of the present disclosure is generally designated as 1. The reactor 1 includes a reaction chamber 10 and a gas distributor 2. A feed gas 5 is introduced into the distributor 2 to distribute feed gas into the inlet of the reaction chamber 10. In this regard, a single feed gas 5 may be introduced into the reaction chamber or additional gases such as a second feed gas 7 may also be included. While FIG. 1 illustrates a first feed gas 5 and second feed gas 7 being fed to the reaction chamber 10, it should be understood that in some embodiments only one feed gas is introduced. In other embodiments, more than two feed gases may be introduced into the reaction chamber 10. In this regard, in embodiments that involve a two-gas system, it should be understood that as used herein, "first feed gas" is a gas with a different composition than the "second feed gas" and vice versa. The first feed gas and second feed gas can compose a plurality of gaseous compounds as long as the mass composition or molar composition of at least one of the compounds in the first feed gas is different than the composition of that compound in the second feed gas.

A product withdrawal tube 12 extends through the distributor 2. Product particles can be withdrawn from the tube 12 and transported to product storage 15. The reaction chamber 10 may include a lower region 13 and a freeboard region 11 which may have a larger radius than the lower region 13. Gas travels upward in the reaction chamber 10 and enters the freeboard region 11. In the freeboard region 11, the gas velocity decreases causing entrained particles to fall back into the lower region 13. Spent gas 16 exits the reactor chamber 10 and can be introduced into further processing units 18. In this regard, it should be understood that the reactor 1 shown in FIG. 1 is exemplary and other reactor designs may be used without departing from the scope of the present disclosure (e.g., reactors that do not include an expanded freeboard region).

In some embodiments of the present disclosure, the overall concentration of silane introduced into the reaction chamber of the fluidized bed reactor is maintained below about 15% by volume. In this regard, as used herein, the phrase "overall concentration" by volume refers to the concentration as averaged over the volumetric flow rates of all gases introduced into the reaction chamber when two or more gasses are introduced into the reaction chamber. If the overall concentration of silane is maintained below about 15% by volume, decomposition of silane prior to entry into the reaction chamber (e.g., deposition onto the distributor or homogeneous silane reaction to form silicon powder) may be minimized which allows the reactor to be operated more efficiently and without significant amounts of downtime required to clear such deposits. In other embodiments, the overall concentration of silane introduced into the reaction chamber is less than about 12% by volume or less than about 8%, from about 1% to about 15%, from about 1% to about 10%, from about 5% to about 15% or from about 10% to about 15% by volume. The remaining amount of gases may be carrier gases such as compounds selected from the group consisting of silicon tetrachloride, hydrogen, argon and helium.

In some embodiments, the feed gas (and gases containing more than about 1% silane in multi-gas systems as described below) is maintained at a temperature below about 400° C. prior to introduction into the distributor to prevent silicon from depositing on the surfaces of the distributor or of the reaction chamber. In other embodiments, the temperature of the feed gas is less than about 350° C., less than about 300° C., less than about 200° C. or even less than about 100° C. prior to entry into the distributor.

Figure 2:
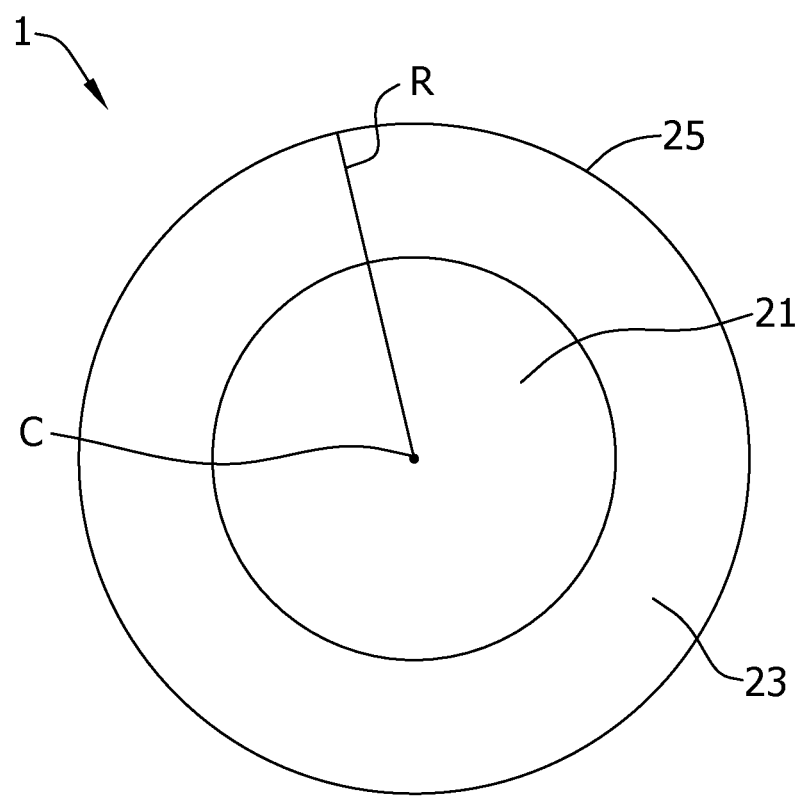
FIG. 2 is a radial cross-section view of a reaction chamber of a fluidized bed reactor with a core region and peripheral region being shown.
Figure 3:
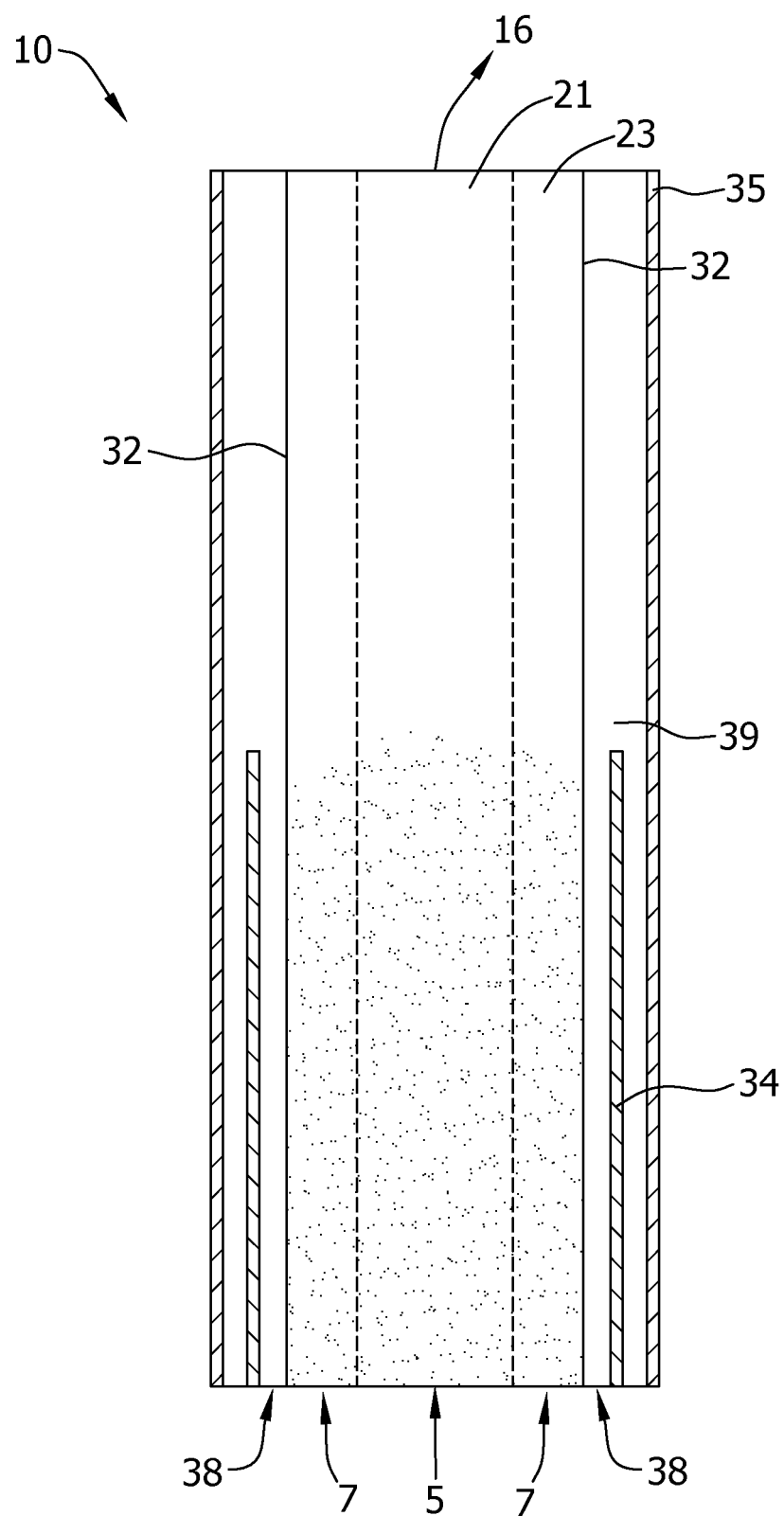
FIG. 3 is an axial cross-section view of a reaction chamber of a fluidized bed reactor with a reaction liner and reactor shell being shown.

Rather than the single-gas system described in the proceeding paragraphs, in some embodiments a multi-gas system may be used to deposit silicon such as the two-gas system shown in FIGS. 1-3. In such two-gas systems, a first feed gas comprising silane is introduced into the core portion of the reactor and a second feed gas with a composition of silane less than that of the first feed gas (such as when the second feed gas contains no amount of silane) is introduced into a peripheral region of the reaction chamber that is near the reaction chamber wall. If such a two gas system is used, preferably the reaction chamber 10 is not partitioned into separate portions (e.g., a separate portion in which a feed gas containing a minor amount of silane or no amount of silane is introduced) near the reaction chamber wall to maximize the portion of the reaction chamber in which silicon deposition may occur. However, unless stated otherwise, the reaction chamber may contain one or more such partitions without departing from the scope of the present disclosure.

Referring now to FIG. 2 in which a cross-section of the fluidized bed reactor 1 is shown, the fluidized bed reactor 1 has a core region 21 that extends from the center C of the reactor to a peripheral region 23. The peripheral region 23 extends from the core region 21 to an annular wall 25. The fluidized bed reactor 1 has a radius R that extends from the center C of the reactor 1 to the annular wall 25. In various embodiments of the present disclosure, the core region extends from the center C to less than about 0.975R, to less than about 0.6R and, in other embodiments, to less than about 0.5R or even to less than about 0.4R. In these and other embodiments, the core region extends from the center C to at least about 0.5R, to at least about 0.6R, to at least about 0.8R or even to at least about 0.9R. In this regard, it should be understood that fluidized bed reactor designs other than as shown in FIG. 2 may be used without departing from the scope of the present disclosure. Regardless of the cross-sectional shape of the fluidized bed reactor, the ratio of the surface area of a cross-section of the core region to the surface area of a cross-section of the peripheral region may be less than about 25:1, less than about 15:1, less than about 10:1, less than about 5:1, less than about 4:3 and, in other embodiments, is less than about 1:1, less than about 1:3, less than about 1:4, less than about 1:5 or less than about 1:25 (e.g., from about 4:3 to about 1:10 or from about 1:1 to about 1:10).

Generally in multi-gas systems, the concentration of silane introduced into the core region 21 of the reaction chamber 10 exceeds the concentration introduced into the peripheral region 23. By directing the thermally decomposable compounds (e.g., silane) to the interior portion of the reaction chamber and away from the reactor wall, deposition of material (e.g., such as silicon) on the reactor wall may be reduced. Generally, any method available to those of skill in the art may be used to direct a first feed gas into a core region of a fluidized bed reactor and a second feed gas into the peripheral region of the reactor may be used. For instance, a distributor that directs feed gases to different portions of the reactor as disclosed in U.S. Patent Publication No. 2009/0324479 and U.S. Patent Publication No. 2011/0158857, both of which are incorporated herein by reference for all relevant and consistent purposes, may be used. In this regard, it should be understood that other methods and apparatus may be used to produce the desired distribution of gases without departing from the scope of the present disclosure.

In accordance with embodiments of the present disclosure in which two-gases are used, the concentration of silane (by volume) in the first feed gas is at least about 25% greater than the concentration of silane in the second feed gas (e.g., if the concentration of silane in the second feed gas is about 10% by volume, the concentration in the first feed gas is about 12.5% by volume or more). In various other embodiments, the concentration (by volume) of silane in the first feed gas is at least about 35% greater than the concentration of silane in the second feed gas or at least about 50%, at least about 75%, at least about 100%, at least about 150%, or at least about 200% greater than the concentration (by volume) of silane in the second feed gas (e.g., from about 25% to about 200%, from about 25% to about 100% or from about 50% to about 200% greater than the concentration (by volume) of silane in the second feed gas). In these and in other embodiments, of the total amount of silane introduced into the fluidized bed reactor, at least about 4% of the silane is introduced into the core region of the fluidized bed reactor (with the remaining 96% being introduced into the peripheral region). In other embodiments, at least about 25%, at least about 50%, at least about 75%, at least about 85%, at least about 95% or about 100% of the silane introduced into the fluidized bed reactor is introduced through the core region.

In such two-gas systems, the first feed gas fed into the distributor for distribution into the core region of the reaction chamber comprises less than about 20% by volume silane. In some embodiments of the present disclosure, the first feed gas introduced into the core of the reaction chamber comprises less than about 15% by volume silane, less than about 12%, less than about 8%, from about 1% to about 20%, from about 5% to about 20% or from about 1% to about 10% by volume silane. It should be noted that as described above in regard to a single gas reaction system, the overall concentration of silane in the gases fed to the reaction chamber in a multi-gas system is preferably maintained below about 15% by volume and, as in other embodiments, less than about 12% by volume or less than about 8%, from about 1% to about 15%, from about 1% to about 10%, from about 5% to about 15% or from about 10% to about 15% by volume.

The second gas may be free of silane (and optionally other thermally decomposable silicon compounds) or may contain an amount of silane. Generally the concentration of silane in the second feed gas introduced into the peripheral region of the reaction chamber is less than that of the first feed gas which is introduced into the core region of the reaction chamber. The second feed gas may contain less than about 15% by volume silane and, in other embodiments, contains less than about 10%, less than about 5%, less than about 3%, less than about 1%, from about 1% to about 15% or from about 1% to about 5% by volume silane. In this regard, it should be understood that the second feed gas may consist essentially of gases other than silane (i.e., contain no amount of silane). For instance, the second feed gas may consist essentially of one or more compounds selected from the group consisting of silicon tetrachloride, hydrogen, argon and helium (e.g., contains only these compounds and excludes other minor amounts of other gaseous impurities). Furthermore in this regard, the second feed gas may consist of one or more compounds selected from silicon tetrachloride, hydrogen, argon and helium.

The temperature of the first feed gas and second feed gas introduced into the fluidized bed reactor may be relatively low compared to conventional methods to reduce deposition of material onto the distributor and onto the reactor walls. It is preferred that each gas that comprises at least about 1% by volume silane (or at least about 1% by volume of thermally decomposable silicon compounds) in the multi-gas system be maintained at a temperature less than about 400° C. prior to introduction into the distributor of the reaction chamber. In other embodiments, each gas that comprises at least about 1% by volume silane are maintained at temperature less than about 350° C., less than about 300° C., less than about 200° C. or even less than about 100° C. prior to entry into the distributor. The first and/or second feed gas may be cooled to maintain such a temperature such as by indirect cooling by cooling liquids (e.g., water or molten salts). If the source of the first feed gas or second feed gas is relatively cool, the gas may be heated by any suitable method including the use of indirect steam or electric heating and/or use of combustion gases.

In some embodiments, the second feed gas is introduced into the reactor at a relatively higher temperature than the first feed gas to reduce the amount of extraneous heat that must be applied to the reactor, particularly in embodiments wherein the second feed such contains less than about 1% by volume silane and does not contain other thermally decomposable silicon compounds. For instance, the second feed gas may be introduced at a temperature of at least about 100° C., at least about 200° C., at least about 300° C., at least about 350° C., at least about 450° C. or even at least about 550° C. (e.g., from about 100° C. to about 600° C., from about 300° C. to about 600° C. or from about ° C. to about 600° C.).

Upon entering the reaction chamber 10 and heating, silane thermally decomposes to produce polycrystalline silicon and hydrogen according to the reaction below:

$$SiH_4 \rightarrow Si + 2H_2 \quad (1).$$

In this regard, it should be understood that reactions other than reaction (1) shown above may occur in the reaction chamber 10 and reaction (1) should not be viewed in a limiting sense; however, reaction (1) may represent the majority of reactions that occur in the reaction chamber.

Methods for Maintaining Adequate Reactor Productivity

It has been found that to maintain acceptable productivity when using the methods described above for reducing the deposition of material on the reactor walls or to even enhance productivity relative to conventional methods for production, one or more of the following methods may be used: (1) the pressure of the fluidized bed reactor may be controlled to be within a specified range as described below, (2) the feed gas may be heated rapidly in the reaction chamber to promote deposition of polycrystalline silicon and/or (3) the diameter of the withdrawn polycrystalline silicon particulate may be controlled to be within a specified range as described below.

In certain embodiments of the present disclosure, the absolute pressure in the fluidized bed reactor is at least about 3 bar. It has been found that by maintaining the pressure of the fluidized bed reactor above about 3 bar, sufficient reactor productivity may be achieved. Generally, significantly higher pressures may also be used (e.g., up to about 25 bar); however higher pressures may be less desirable as such pressures may involve relatively high application of extraneous heat (e.g., higher temperatures) through the reactor walls and may result in an unacceptable amount of silicon deposition on the reactor walls. In certain embodiments, the pressure of the reactor is controlled to be at least about 4 bar, at least about 5 bar, at least about 10 bar, at least about 15 bar, at least about 20 bar or even about 25 bar or more (e.g., from about 3 bar to about 25 bar or from about 4 bar to about 20 bar).

In this regard, it should be understood that the pressure of the reactor typically decreases as gas passes through the reactor. To account for this variation, the pressure of the reactor may be measured near the gas discharge to ensure that the minimum pressures (e.g., about 3 bar) are achieved. In certain embodiments of the present disclosure, the pressure of the spent gas discharged from the reactor is measured to ensure that the fluidized bed is operated within the recited pressure ranges. For instance, the pressure of the spent gas may be at least about 3 bar, at least about 4 bar, at least about 5 bar, at least about 10 bar, at least about 15 bar, at least about 20 bar or even about 25 bar or more (e.g., from about 3 bar to about 25 bar or from about 4 bar to about 20 bar).

As described above, the temperature of the feed gas (and first feed gas and/or the second feed as in two-gas systems) introduced into the fluidized bed reactor may be less than about 400° C. It has been found that by rapidly heating the incoming gas the productivity of the fluidized bed reactor may be increased. Referring now to FIG. 3 in which the reaction chamber 10 of the fluidized bed reactor is shown according to one or more embodiments of the present disclosure, the heating apparatus 34 of the fluidized bed reactor may be maintained within an annular inner chamber 39 formed between a reaction liner 32 (i.e., the reaction chamber wall) and an outer shell 35 of the reactor. By positioning the heating apparatus 34 inward of the outer shell 35, the heating apparatus may be operated at lower temperatures as heat is not directed through both the outer shell 35 and the liner 32 to reach the contents of the reaction chamber. Such a configuration allows relatively rapid heating to be achieved and avoids use of high temperature gradients across the reactor which may degrade the reactor materials and limits the materials that may be used to form the outer shell 35.

The heating apparatus 34 may be an electrical resistance heater or one or more induction coils; however, other types of heating apparatus may be used without limitation (e.g., the heating apparatus 34 may be heated gas such as a combustion gas). The liner 32 may be made of any material suitable for fluidized bed reactor operations and for production of granular polycrystalline silicon and, particularly, material that is sufficiently resistant to etching and degradation which may result in contamination of polycrystalline silicon product. Suitable materials include, for example, quartz, graphite coated with silicon or coated with silicon carbide, silicon carbide coated with silicon, zinc alloys and tantalum alloys. The outer shell 35 may be made of any number of metallic materials (e.g., metal alloys including carbon steel or stainless steel). The liner 32 and outer shell 32 materials may be selected to withstand the desired operating temperatures, pressures and differential pressures of the reaction and to be relatively inert in environments for thermally decomposing silane to produce polycrystalline silicon.

In various embodiments, a gas 38 (e.g., argon, hydrogen, nitrogen and/or helium) may be included within the inner chamber 39 and is preferably continuously introduced into and withdrawn from the inner chamber. This gas 38 acts to protect the heating apparatus 34 from deposition of silicon on various outside surfaces due to a leak through the reaction liner 32 into the inner chamber 39. The gas 38 may be maintained at a pressure below the pressure of the process gases 5, 7 such that if the liner 32 develops an opening (e.g., crack or pin-holes), the process gas passes through the liner 32 to prevent gas 38 from entering the reaction chamber so as to avoid migration of contaminants into the reaction chamber. In embodiments in which the liner 32 is composed of quartz (and, in particular, is composed essentially only of quartz), the differential pressure between the gas 38 and process gas 5, 7 may be controlled to avoid collapse of the reaction liner 32. For other materials, it may be advantageous to maintain the pressure of the gas 38 greater than about 1 bar below the pressure of the process gas 5, 7 to prohibit contamination through the liner 32 into the reaction chamber. The gas 38 may be maintained at a pressure greater than about 1 bar, at least about 1.1 bar, at least about 5 bar, at least about 10 bar, at least about 15 bar, or at least about 20 bar or more below the process gas 5, 7 pressure (e.g., from about 1 bar to about 20 bar, from about 1.1 bar to about 20 bar, from about 1 bar to about 20 bar or from about 5 bar to about 20 bar). In this regard, the upper limit on the pressure drop may be determined based on the structural integrity of the reactor wall, which will in turn be impacted by the material of construction, wall thickness and reactor diameter.

Generally, smaller diameter reaction chambers 10 may withstand greater differential pressures. However, larger diameter reaction chambers may be desirable to achieve greater throughput through the reactor. In some embodiments, the diameter of the reaction chamber 10 may be at least about 10 inches, at least about 20 inches, at least about 30 inches or at least about 40 inches or more.

The gas 38 may also be maintained at a temperature below the process gasses 5, 7 to prevent corrosion. Further, gas 38 may be monitored as it is withdrawn from the inner chamber 39 to detect the presence of process gas (e.g., silane) which would indicate that that the liner 32 had developed an opening (e.g., crack or pin-holes) and that repairs may be needed. The inner chamber 39 (or a portion thereof) may include insulating material to prevent heat from being lost. The insulating material used may be any material suitable for insulating at high temperatures (both carbon and inorganic materials) as appreciated by those of skill in the art and may take a variety of forms including insulating blocks, blankets or felts.

Exemplary fluidized bed reactors for use in accordance with the present disclosure include those disclosed in U.S. Patent Publication No. 2008/0299291, U.S. Patent Publication No. 2008/0241046 and U.S. Patent Publication No. 2009/0095710, each of which is incorporated herein by reference for all relevant and consistent purposes. In this regard, it should be understood that reactor designs other than as shown in FIG. 3 and other than as described in the recited publications may be used without departing from the scope of the present disclosure.

Upon entry into the fluidized bed reactor, the one or more feed gases are heated and continue to heat as they rise in the reaction chamber. The reaction gases may be heated to at least about 500° C. prior to being discharged from the fluidized bed reactor (or prior to being quenched as described below) and, in other embodiments, to at least about 600° C., to at least about 650° C., to at least about 700° C., to at least about 750° C., from about 600° C. to about 800° C. or from about 700° C. to about 800° C.

As shown in FIG. 1, particulate polycrystalline silicon is withdrawn from the product withdrawal tube 12. Particulate polycrystalline silicon may be withdrawn from the reactor intermittently as in batch operations; however, it is preferred that the particulate product be withdrawn continuously. Regardless of whether batch or continuous withdrawal of silicon product is used, it has been found that the size of the product particles when withdrawn from the reactor influences the reactor productivity. For instance, it has been found that generally increasing the size of the withdrawn silicon particulate results in increased reactor productivity; however if the product particles are allowed to grow too large, contact between the gas and solid phases in the reactor may be reduced thereby reducing productivity. Accordingly, in various embodiments of the present disclosure, the mean diameter of the particulate polycrystalline silicon that is withdrawn from the reactor is from about 600 μm to about 2000 μm or from about 800 μm to about 1300 μm. In this regard, it should be understood that references herein to the mean diameter of various particles refers to the Sauter mean diameter unless stated otherwise. The Sauter mean diameter may be determined according to methods generally known by those of skill in the art.

Use of one or more of the methods described above may allow for relatively high reactor productivity to be maintained even in embodiments wherein one or more of the methods for reducing the deposition of material on the reactor walls as also described above are employed. As appreciated by those of skill in the art, the reactor productivity may be expressed as a rate of polycrystalline silicon production per reactor cross-section area. In accordance with the present disclosure, when one or more of the above-referenced methods for increasing the reactor productivity are used, at least about 100 kg/hr of silicon deposits on the silicon particles within the reactor per square meter of fluidized bed reactor cross-section. In other embodiments, at least about 150 kg/hr, at least about 250 kg/hr, at least about 300 kg/hr, at least about 500 kg/hr, at least about 700 kg/hr, at least about 1000 kg/hr, at least about 2000 kg/hr, at least about 3000 kg/hr, at least about 4000 kg/hr or from about 100 kg/hr to about 5000 kg/hr, from about 250 kg/hr to about 5000 kg/hr, from about 100 kg/hr to about 4000 kg/hr or from about 100 kg/hr to about 1000 kg/hr of silicon deposits on the silicon particles per square meter of fluidized bed reactor cross-section.

In this regard, it should be understood that in embodiments wherein the cross-section of the fluidized bed reactor varies along the length of the reactor, the recited cross-sectional area refers to a cross-section that is averaged over the length of the reactor (e.g., the length of the reactor in which at least about 90% of the deposition occurs). It should be further understood that the reactor may have localized regions in which the productivity is higher or lower than the recited values without departing from the scope of the present disclosure.

Other Parameters for Operation of the Fluidized Bed Reactor

Silicon seed particles are added to the reactor to provide a surface to which polycrystalline silicon may deposit. The seed particles continuously grow in size until they exit the reactor as particulate polycrystalline silicon product. The seed particles may be added to the reactor batchwise or continuously. The average diameter (i.e., Sauter mean diameter) of the crystal seed particles may be from about 50 μm to about 800 μm and, in some embodiments, is from about 200 μm to about 500 μm. The source of silicon seed particles include product particles collected from the reactor that are ground to the desired size and/or small polycrystalline silicon particles gathered with and separated from the granular polycrystalline product.

During operation of the fluidized bed reactor system, the fluidizing gas velocity through the reaction zone of the fluidized bed reactor is maintained above the minimum fluidization velocity of the polycrystalline silicon particles. The gas velocity through the fluidized bed reactor is generally maintained at a velocity of from about 1 to about 8 times the minimum fluidization velocity necessary to fluidize the particles within the fluidized bed. In some embodiments, the gas velocity is from about 1.1 to about 3 times the minimum fluidization velocity necessary to fluidize the particles within the fluidized bed. The minimum fluidization velocity varies depending on the properties of the gas and particles involved. The minimum fluidization velocity may be determined by conventional means (see p. 17-4 of Perry's Chemical Engineers' Handbook, 7th. Ed., incorporated herein by reference for all relevant and consistent purposes). Although the present disclosure is not limited to specific minimum fluidization velocities, minimum fluidization velocities useful in the present disclosure range from about 0.7 cm/sec to about 250 cm/sec or even from about 6 cm/sec to about 100 cm/sec. Average gas residence times for gases introduced into the reaction chamber may be less than about 20 seconds or, as in other embodiments, less than about 12 seconds, less than about 9 seconds, less than about 4 seconds, less than about 0.1 seconds, or from about 0.1 seconds to about 20 seconds.

Gas velocities higher than the minimum fluidization flow rate are often desired to achieve higher productivities and to prevent local de-fluidization. As the gas velocity increases beyond the minimum fluidization velocity, the excess gas forms bubbles, increasing the bed voidage. The bed can be viewed to consist of bubbles and "emulsion" containing gas in contact with silicon particles. The quality of the emulsion is quite similar to the quality of the bed at the minimum fluidization condition. The local voidage in the emulsion is close to the minimum fluidization bed voidage. Hence, bubbles are generated by the gas introduced in excess of what is required to achieve the minimum fluidization. As the ratio of actual gas velocity to the minimum fluidization velocity increases, the bubble formation intensifies. At a very high ratio, large slugs of gas are formed in the bed. As the bed voidage increases with the total gas flow rate, the contact between solids and gases becomes less effective. For a given volume of the bed, the surface area of solids in contact with reacting gases decreases with increasing bed voidage resulting in reduced conversion to the polycrystalline silicon product. Accordingly, the gas velocity should be controlled to maintain decomposition within acceptable levels.

In some embodiments of the present disclosure and as shown in FIG. 1, the reaction chamber 10 of the fluidized bed reactor 1 includes a "freeboard" region 11 in which the diameter of the reaction chamber is increased to reduce the velocity of the fluidization gas and allow particulate material to separate from the gas. In this regard, it should be understood that in embodiments in which the reactor does include a freeboard region, this region is considered to be part of the reaction chamber unless stated otherwise (e.g., for determination of the mean radius of the reactor, residence time and the like). A quench gas may be introduced into the freeboard region of the reactor (e.g., silicon tetrachloride, hydrogen, argon and/or helium) to reduce the formation of silicon dust and to reduce the deposition of silicon at the outlet and freeboard regions of the reactor by decreasing the temperature of the gas prior to discharge from the reactor. Suitable methods for using such a quench gas are described in U.S. Pat. No.

4,868,013, which is incorporated herein by reference for all relevant and consistent purposes. The temperature and flow rate of the quench gas should be selected to cause the temperature of the discharged spent gas to be less than about 500° C. and, in other embodiments, less than about 400° C., less than about 300° C., from about 200° C. to about 500° C. or from about 200° C. to about 400° C. The temperature of the quench gas may be less than about 400° C., less than about 300° C., less than about 200° C. or less than about 100° C. (e.g., from about 10° C. to about 400° C., from about 10° C. to about 300° C. or from about 100° C. to about 400° C.). The weight ratio of process gases introduced into the reactor to quench gas may be from about 20:1 to about 700:1 or from about 50:1 to about 300:1.

In some embodiments of the present disclosure, the conversion of silane in the fluidized bed reactor may be at least about 20%, at least about 40%, at least about 50%, at least about 80%, at least about 90%, at least about 95% or even at least about 99% (e.g., from about 80% to about 100%, from about 90% to about 99%, from about 80% to about 99%). In this regard, it should be understood that conversion may depend on a number of factors including the reactor design and operating parameters (temperatures, pressures, etc).

EXAMPLES

Example 1

Production of Polycrystalline Silicon from Decomposition of Silane in a Single Gas High Pressure Fluidized Bed Reactor A bed of silicon particles with Sauter mean diameter of 655 μm was fluidized using a mixture of silane and hydrogen gas. The silane volume concentration in the feed gas was maintained at 10.1% with the gas mixture being preheated to 193° C. before entering the fluidized bed reaction chamber. Absolute pressure of the reactor gas discharge was maintained at 7.5 bar and the reaction chamber was maintained at 698° C. Average gas velocity in the bed was maintained at 1.6 times the minimum fluidization velocity such that the calculated average gas residence time was 0.6 seconds. Gas pressure in the heating chamber (chamber 38 in FIG. 3) was maintained at 0.01 bar above the pressure in the reaction chamber. Silane concentration in the gas discharge was measured to assess the conversion inside the reactor. The silane conversion was found to be 99.5%. The productivity of the reactor under this operation was calculated to be 560 kg/hr per square meter of the reactor.

Example 2

Modeled Production of Polycrystalline Silicon from Decomposition of Silane in a Two Gas High Pressure Fluidized Bed Reactor Production of polycrystalline silicon by the thermal decomposition of silane in a high pressure fluidized bed reactor in which hydrogen was fed into the peripheral region of the reaction chamber and a silane-containing gas was introduced into the core of the reaction chamber was modeled using Computational Fluid Dynamics (CFD) software. The overall silane concentration in the gases fed into the reactor was maintained at 2% by volume. The gas introduced into the core region of the reactor contained 4.8% by volume and entered the core region at a temperature of 395° C. The gas introduced into the peripheral region of the reactor contained no silane and entered the reactor at a temperature of 600° C. The ratio of the surface area of the core region to the surface area of the peripheral region of the reaction chamber was 1:2. Pressure of the reactor gas discharge was maintained at 20 bar absolute and the reaction chamber was maintained at 700° C. The modeled data indicated that the silane conversion was 99.9%. The productivity of this simulated reactor would be 180 kg/hr of polycrystalline silicon per square meter of reaction chamber cross-section.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A process for depositing polycrystalline silicon on polycrystalline silicon particles by the thermal decomposition of silane in a fluidized bed reactor having a reaction chamber, the reaction chamber having a cross-section through which feed gases pass, the fluidized bed reactor producing at least about 100 kg/hr of polycrystalline silicon per square meter of reaction chamber cross-section, the process comprising introducing one or more feed gases into the reaction chamber with one or more of the feed gases comprising silane, the overall concentration of silane in the feed gases fed into the reaction chamber being less than about 15% by volume, the pressure in the reaction chamber being at least about 4 bar, and the average residence time of feed gases introduced into the reaction chamber is less than about 20 seconds; wherein silane thermally decomposes in the reaction chamber to deposit at least about 100 kg/hr of polycrystalline silicon per square meter of reaction chamber cross-section on the polycrystalline silicon particles.

2. The process as set forth in claim 1 wherein the temperature of all feed gases with a concentration of silane of at least about 1% is less than about 400° C. prior to entry into the reaction chamber.

3. The process as set forth in claim 1 wherein the pressure in the reaction chamber is at least about 10 bar.

4. The process as set forth in claim 1 wherein a spent gas is withdrawn from the fluidized bed reactor, the pressure of the spent gas being at least about 15 bar.

5. The process as set forth in claim 1 wherein particulate polycrystalline silicon is withdrawn from the fluidized bed reactor, the Sauter mean diameter of the particulate polycrystalline silicon being from about 600 μm to about 2000 μm.

6. The process as set forth in claim 1 wherein at least about 300 kg/hr of silicon deposits on the silicon particles per square meter of reaction chamber cross-section.

7. The process as set forth in claim 1 wherein the overall concentration of silane in feed gases introduced into the reaction chamber is less than about 8% by volume.

8. The process as set forth in claim 1 wherein the reaction chamber is not partitioned into separate portions.

9. The process as set forth in claim 1 wherein the fluidized bed reactor comprises an annular inner chamber formed between a reaction chamber wall and an outer shell, the process comprising maintaining a pressure in the annular inner chamber at least about 1.1 bar below the pressure within the reaction chamber.

10. The process as set forth in claim 1 wherein the reaction chamber is heated to at least about 600° C.

11. The process as set forth in claim 1 wherein no more than one feed gas is introduced into the reaction chamber.

12. The process as set forth in claim 1 wherein a first feed gas and second feed gas are introduced into the reaction chamber.

13. The process of claim 12 wherein:
the first feed gas comprises between about 5% and about 20% by volume silane, and the temperature of the first feed gas is less than about 350° C. prior to entry into the reaction chamber; and
the second feed gas comprises less than about 5% by volume silane, and the temperature of the second feed gas is between about 350° C. and about 600° C. prior to entry into the reaction chamber.

14. The process as set forth in claim 1 wherein particulate polycrystalline silicon is withdrawn from the fluidized bed reactor, the Sauter mean diameter of the particulate polycrystalline silicon being from about 800 μm to about 1300 μm.

15. The process as set forth in claim 1 wherein the pressure in the reaction chamber is at least about 20 bar.

16. A process for depositing polycrystalline silicon on polycrystalline silicon particles by the thermal decomposition of silane in a fluidized bed reactor having a reaction chamber, the reaction chamber having a core region, a peripheral region and a cross-section through which feed gases pass, the fluidized bed reactor producing at least about 100 kg/hr of polycrystalline silicon per square meter of reaction chamber cross-section, the process comprising:
introducing a first feed gas comprising silane into the core region of the reaction chamber, the reaction chamber containing silicon particles and the first feed gas containing less than about 20% by volume silane, wherein silane thermally decomposes in the reaction chamber to deposit at least about 100 kg/hr of polycrystalline silicon per square meter of reaction chamber cross-section on the polycrystalline silicon particles; and
introducing a second feed gas into the peripheral region of the reaction chamber, wherein the concentration of silane in the first feed gas exceeds the concentration in the second feed gas and the pressure in the reaction chamber is at least about 4 bar;
wherein the average residence time of feed gases introduced into the reaction chamber is less than about 20 seconds.

17. The process as set forth in claim 16 wherein the fluidized bed reactor comprises an annular wall and has a circular cross-section having a center and a radius R, wherein the core region extends from the center to at least about 0.6R and the peripheral region extends from the core region to the annular wall.

18. The process as set forth in claim 16 wherein the temperature of the first feed gas is less than about 400° C. prior to entry into the reaction chamber.

19. The process as set forth in claim 16 wherein the temperature of the second feed gas is less than about 400° C. prior to entry into the reaction chamber.

20. The process as set forth in claim 16 wherein the second feed gas comprises less than about 1% by volume silane and the temperature of the second feed gas is at least about 300° C. prior to entry into the reaction chamber.

21. The process as set forth in claim 16 wherein the pressure in the reaction chamber is at least about 10 bar.

22. The process as set forth in claim 16 wherein a spent gas is withdrawn from the fluidized bed reactor, the pressure of the spent gas being at least about 4 bar.

23. The process as set forth in claim 16 wherein the concentration by volume of silane in the first feed gas is at least about 50% greater than the concentration by volume of silane in the second feed gas.

24. The process as set forth in claim 16 wherein at least about 75% of the silane introduced into the fluidized bed reactor is introduced through the core region.

25. The process as set forth in claim 16 wherein particulate polycrystalline silicon is withdrawn from the fluidized bed reactor, the Sauter mean diameter of the particulate polycrystalline silicon being from about 600 μm to about 2000 μm.

26. The process as set forth in claim 16 wherein the average residence time of gas introduced into the reaction chamber is less than about 12 seconds.

27. The process as set forth in claim 16 wherein at least about 1000 kg/hr of silicon deposits on the silicon particles per square meter of reaction chamber cross-section.

28. The process as set forth in claim 16 wherein the second feed gas comprises less than about 1% by volume silane.

29. The process as set forth in claim 16 wherein the second feed gas consists essentially of compounds other than silane.

30. The process as set forth in claim 16 wherein the second feed gas consists essentially of one or more compounds selected from the group consisting of silicon tetrachloride, hydrogen, argon and helium.

31. The process as set forth in claim 16 wherein the first feed gas comprises less than about 15% by volume silane.

32. The process as set forth in claim 16 wherein the overall concentration of silane in feed gases introduced into the reaction chamber is less than about 8% by volume.

33. The process as set forth in claim 16 wherein the reaction chamber is not partitioned into separate portions.

34. The process as set forth in claim 16 wherein the fluidized bed reactor comprises an annular inner chamber formed between a reaction chamber wall and an outer shell, the process comprising maintaining a pressure in the annular inner chamber at least about 5 bar below the pressure within the reaction chamber.

35. The process as set forth in claim 16 wherein the reaction chamber is heated to at least about 500° C.

36. The process as set forth in claim 16 wherein the pressure in the reaction chamber is at least about 20 bar.

37. A process for depositing polycrystalline silicon on polycrystalline silicon particles by the thermal decomposition of silane in a fluidized bed reactor having a reaction chamber with a cross-section and a distributor for distributing gases into the reaction chamber, the fluidized bed reactor producing at least about 100 kg/hr of polycrystalline silicon per square meter of reaction chamber cross-section, the process comprising introducing one or more feed gases into the distributor to distribute the gases into the reaction chamber, the reaction chamber containing silicon particles and the temperature of each feed gas comprising at least about 1% by volume silane being less than about 400° C. prior to introduction into the distributor, the pressure in the reaction chamber being at least about 4 bar, and the average residence time of feed gases introduced into the reaction chamber is less than about 20 seconds, wherein silane thermally decomposes in the reaction chamber to deposit at least about 100 kg/hr of polycrystalline silicon per square meter of reaction chamber cross-section on the polycrystalline silicon particles.

38. The process as set forth in claim 37 wherein the temperature of each feed gas comprising at least about 1% by volume silane is less than about 300° C. prior to entry into the distributor.

39. The process as set forth in claim 37 wherein the pressure in the reaction chamber is at least about 10 bar.

40. The process as set forth in claim 37 wherein a spent gas is withdrawn from the fluidized bed reactor, the pressure of the spent gas being at least about 20 bar.

41. The process as set forth in claim 37 wherein particulate polycrystalline silicon is withdrawn from the fluidized bed reactor, the Sauter mean diameter of the particulate polycrystalline silicon being from about 600 μm to about 2000 μm.

42. The process as set forth in claim 41 wherein a first feed gas and second feed gas are introduced into the reaction chamber, and further wherein:
- the first feed gas comprises between about 5% and about 20% by volume silane, and the temperature of the first feed gas is less than about 350° C. prior to entry into the reaction chamber; and
- the second feed gas comprises less than about 5% by volume silane, and the temperature of the second feed gas is between about 350° C. and about 600° C. prior to entry into the reaction chamber.

43. The process as set forth in claim 37 wherein the average residence time of gas introduced into the reaction chamber is less than about less than about 4 seconds.

44. The process as set forth in claim 37 wherein at least about 2000 kg/hr of silicon deposits on the silicon particles per square meter of reaction chamber cross-section.

45. The process as set forth in claim 37 wherein the overall concentration of silane in feed gases introduced into the reaction chamber is less than about 15% by volume.

46. The process as set forth in claim 37 wherein the reaction chamber is not partitioned into separate portions.

47. The process as set forth in claim 37 wherein the fluidized bed reactor comprises an annular inner chamber formed between a reaction chamber wall and an outer shell, the process comprising maintaining a pressure in the annular inner chamber greater than about 1 bar below the pressure within the reaction chamber.

48. The process as set forth in claim 37 wherein the reaction chamber is heated to at least about 700° C.

49. The process as set forth in claim 37 wherein the pressure in the reaction chamber is at least about 20 bar.

\* \* \* \* \*